INVENTORS
FREDERICK G. FOLBERTH
& WILLIAM M. FOLBERTH
BY
*Bosworth & Sessions*
ATTORNEYS

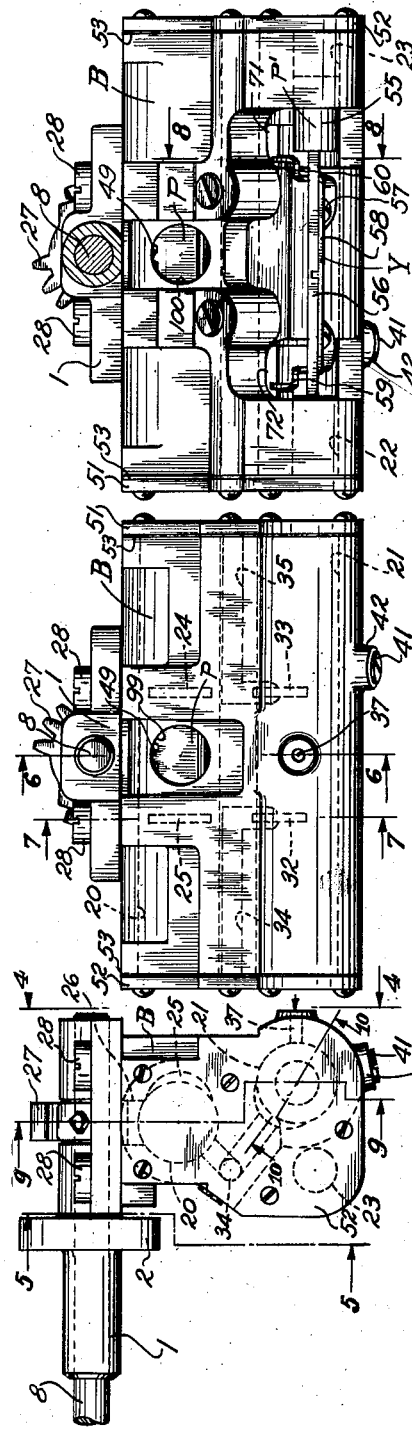
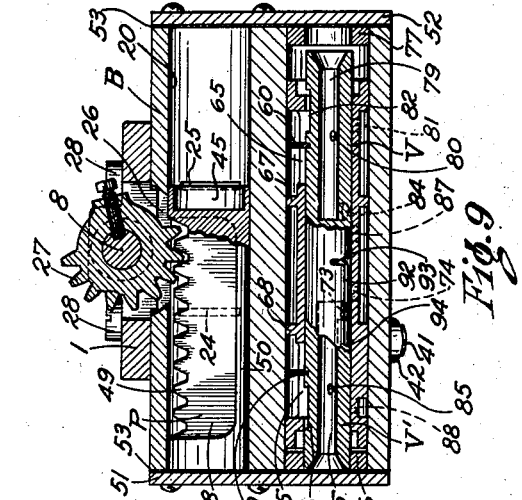
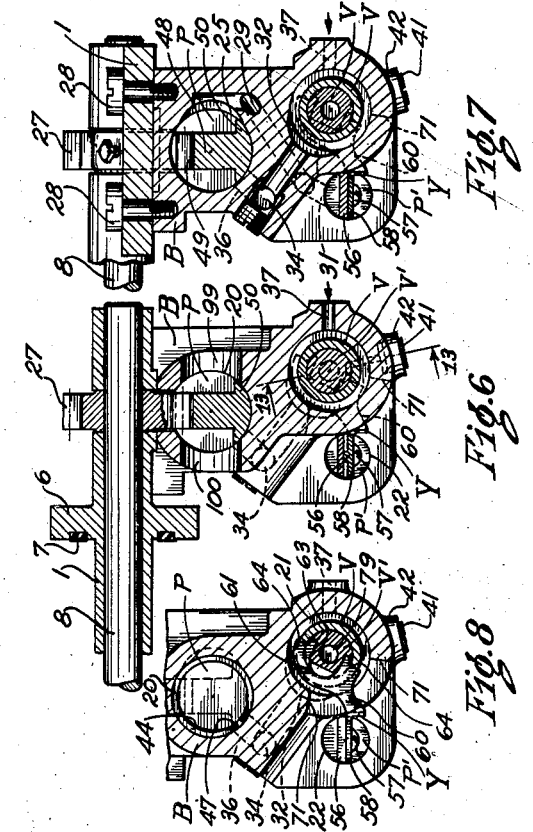
INVENTORS
FREDERICK G. FOLBERTH
& WILLIAM M. FOLBERTH
BY Bosworth & Sessions
ATTORNEYS July 4, 1944.  F. G. FOLBERTH ET AL  2,353,022
MOTOR
Filed Jan. 16, 1942  4 Sheets-Sheet 3
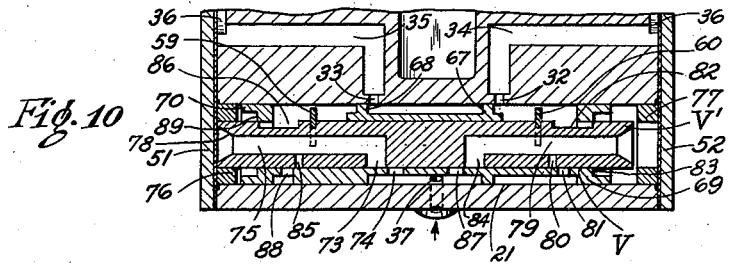
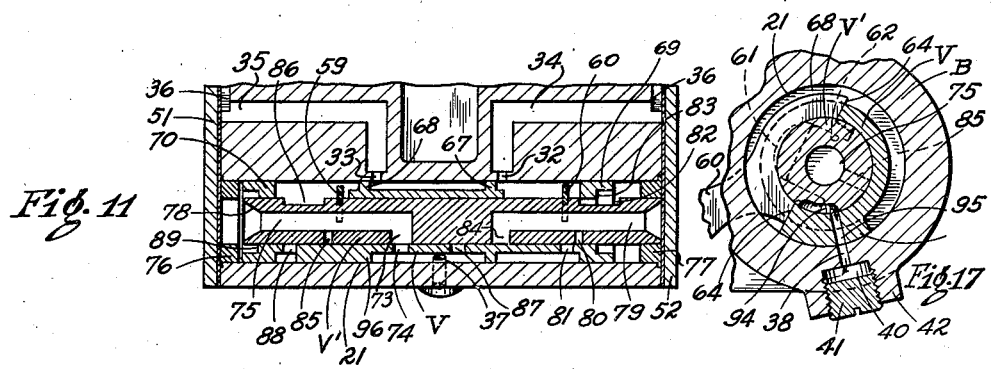
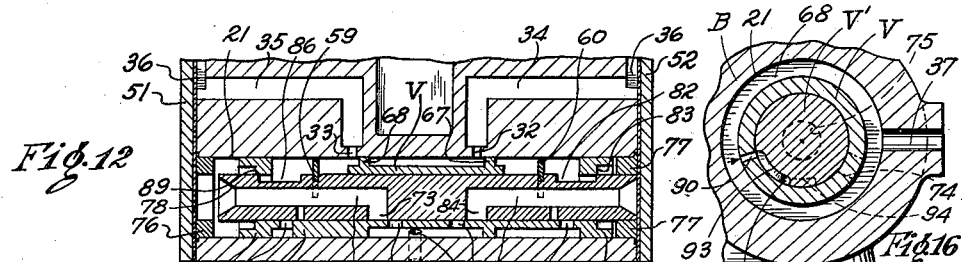
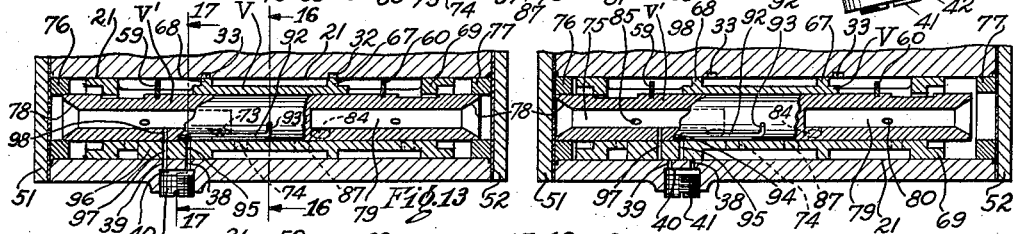
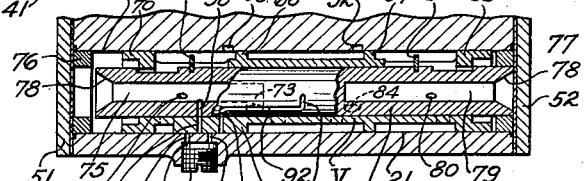
INVENTORS
FREDERICK G. FOLBERTH
& WILLIAM M. FOLBERTH
BY Bosworth & Sessions
ATTORNEYS July 4, 1944.  F. G. FOLBERTH ET AL  2,353,022
MOTOR
Filed Jan. 16, 1942  4 Sheets-Sheet 4
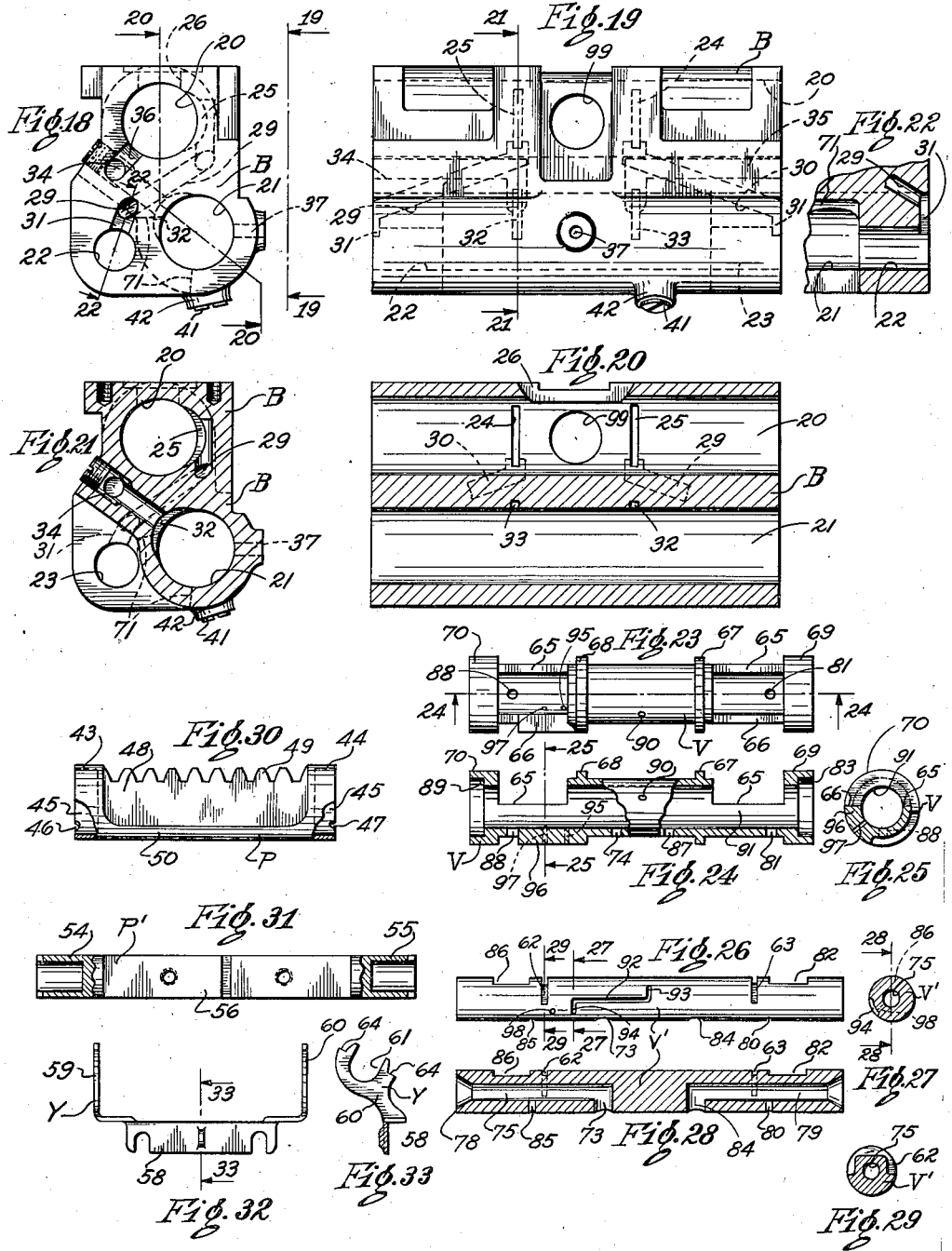
INVENTORS
FREDERICK G. FOLBERTH
& WILLIAM M. FOLBERTH
BY
Bosworth & Sessions
ATTORNEYS Patented July 4, 1944

2,353,022

UNITED STATES PATENT OFFICE 2,353,022

MOTOR

Frederick G. Folberth and William M. Folberth, Cleveland, Ohio

Application January 16, 1942, Serial No. 426,942

6 Claims. (Cl. 121—153)

This invention relates to fluid pressure actuated motors and more particularly to an improved motor and valve mechanism therefor especially adapted for operating windshield cleaners or the like.

In our co-pending United States patent applications Serial No. 382,040, filed March 6, 1941, and Serial No. 412,142, filed September 24, 1941, we have described and claimed certain improvements in fluid pressure actuated motors. The present application contains certain subject matter common to said co-pending applications and certain improvements not disclosed in said applications, and is therefore a continuation in part of said applications.

It is among the objects of our present invention to provide a compact, light weight, efficient and powerful fluid pressure actuated motor for operating windshield cleaners of the oscillating squeegee type, or other mechanisms.

Other objects of our invention are the provision of a fluid pressure actuated motor and a valve mechanism therefor which will always instantaneously start upon application of fluid under pressure; the provision of a fluid pressure actuated motor of the type described which is completely free from spring elements of any kind; the provision of a fluid pressure actuated motor particularly adapted for operating airplane windshield cleaners by means of oil or other liquid under pressure; the provision of a fluid pressure actuated motor which will have extremely low leakage if, for any reason, the driving shaft of the motor is stopped or stalled in any position of its cycle, such as might possibly occur if the squeegee blade of an airplane windshield cleaner should freeze to the windshield under icing conditions; and, the provision of a rugged motor of the type described which will operate for long periods of time under all conditions of service without attention or adjustment.

The above and other objects of our invention will appear from the following description of one embodiment thereof, reference being had to the accompanying drawings in which—

Figure 3 is an end elevational view of the motor shown in Figure 1, the oil collecting casing being omitted.

Figure 4 is a side elevation of the fluid pressure supply side of the motor, taken on line 4—4 of Figure 3.

Figure 5 is a side elevation showing the shaft side of the motor, and taken on line 5—5 of Figure 3.

Figure 6 is a vertical cross sectional view taken on line 6—6 of Figure 4.

Figure 7 is a vertical cross sectional view taken on line 7—7 of Figure 4.

Figure 8 is a fragmentary vertical cross sectional view taken on line 8—8 of Figure 5.

Figure 9 is a longitudinal vertical sectional view taken on line 9—9 of Figure 3.

Figure 10 is a fragmentary cross sectional view of the valve mechanism of our improved motor, taken on line 10—10 of Figure 3, and showing the valve mechanism in one extreme position.

Figure 11 is a view similar to Figure 10 but illustrating the valve mechanism in an intermediate position.

Figure 12 is a view similar to Figure 10 but showing the valve mechanism in the opposite extreme position.

Fig. 13 is a fragmentary cross sectional view of the valve mechanism, taken on line 13—13 of Figure 6, and showing the valve parts in what may be described as a dead center position.

Figure 14 is a cross sectional view similar to Figure 13, but showing the valve parts in the extreme position corresponding to Figure 10.

Figure 15 is a cross sectional view similar to Figure 13 but showing the valve parts in the extreme position corresponding to Figure 12.

Figure 16 is an enlarged cross sectional view taken on line 16—16 of Figure 13, and illustrating certain of the dead center preventing passages.

Figure 17 is an enlarged cross sectional view taken on line 17—17 of Figure 13, and showing certain other of the dead center preventing passages.

Figure 18 is an end elevation of the main motor block or housing.

Figure 19 is a side elevation of the motor block taken on line 19—19 of Figure 18.

Figure 20 is a longitudinal sectional view taken on line 20—20 of Figure 18.

Figure 21 is a cross sectional view taken on line 21—21 of Figure 19.

Figure 22 is a fragmentary cross sectional view taken on line 22—22 of Figure 18 and showing the connection from the main cylinder to one of the valve actuating cylinders.

Fig. 23 is a detached side elevation of the outer tubular valve member.

Figure 24 is a cross sectional view taken on line 24—24 of Figure 23.

Figure 25 is a cross sectional view taken on line 25—25 of Figure 24.

Figure 26 is a detached side elevational view of the inner valve member.

Figure 27 is a cross sectional view taken on line 27—27 of Figure 26.

Figure 28 is a longitudinal sectional view taken on line 28—28 of Figure 27.

Figure 29 is a cross sectional view taken on line 29—29 of Figure 26.

Figure 30 is a detached view of the main piston, portions of the end walls being broken away to illustrate certain features of its construction.

Figure 31 is a detached view of the double ended valve actuating plunger or piston, partly in section.

Figure 32 is a side elevation of the yoke member which connects the valve actuating plunger shown in Figure 31 to the inner valve member shown in Figure 26.

Figure 33 is a cross sectional view taken on line 33—33 of Figure 32.

Figure 1:
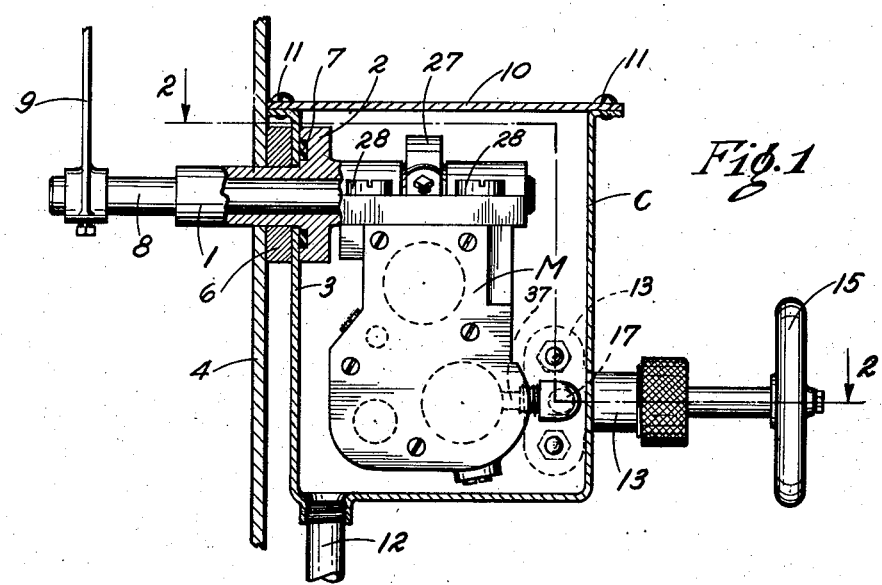
Figure 1 is an end view of our windshield cleaner motor housed in an oil collecting casing, the casing and a portion of the motor shaft bearing being shown in cross section.
Figure 2:
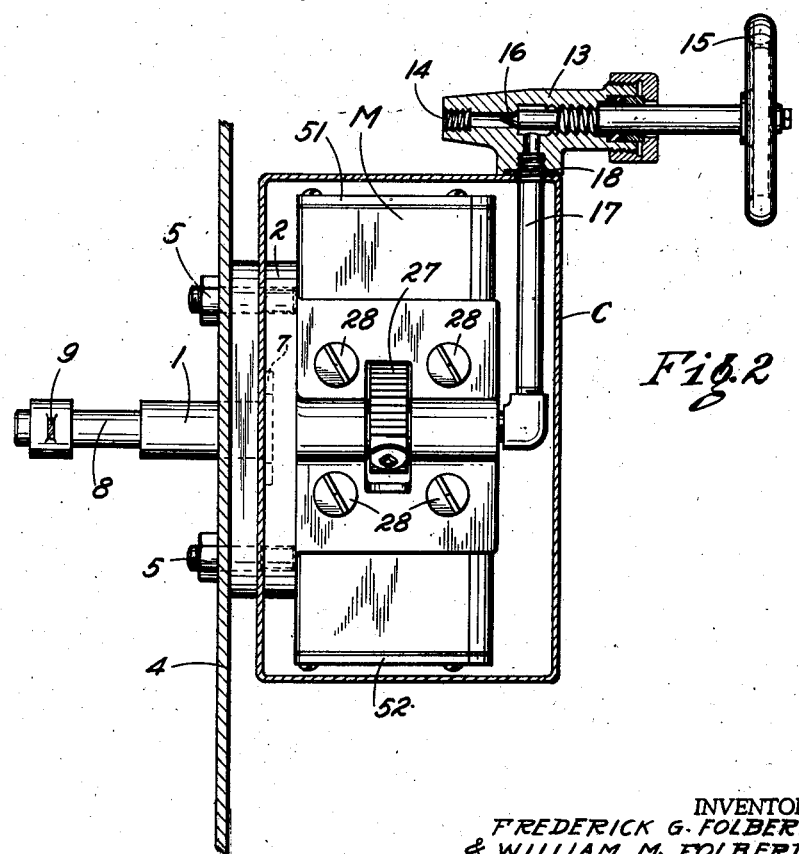
Figure 2 is a horizontal cross sectional view of the motor and casing shown in Figure 1, taken substantially on line 2—2 of Figure 1.

In the drawings we have illustrated our invention as embodied in a hydraulic windshield cleaner motor. Referring particularly to Figures 1 and 2, the motor is referred to generally by the reference character M and is provided with a shaft bearing portion 1 which extends away from the flange 2 and through the side wall 3 of the oil collecting casing C. The wall 4 may be considered to be a part of the structure on which the motor is mounted and, as is best seen in Figure 2, screws 5 extend through the wall 4 and spacer member 6 and are threaded into the flange 2. Suitable packing material 7 is disposed in a groove in the outer face of flange 2 so that when the screws 5 are tightened the motor is supported in the casing C and a fluid tight joint is established between the flange 2 and the side wall 3 of the casing.

The motor shaft 8 extends beyond the bearing 1 and may carry the squeegee or scraper arm 9 as illustrated in Figures 1 and 2, or may be connected through suitable operating linkage (not shown) to operate one or more remotely located squeegee arms. The housing C is provided with a fluid-tight cover 10 secured by screws 11, and has a centrally located outlet pipe 12 which carries away oil, or other operating fluid, which is discharged from the motor M during operation.

In order to supply fluid under pressure to the motor M, we provide a valve 13 having an inlet 14 connected to any suitable supply of fluid under pressure. This valve may conveniently be of the type illustrated in which turning the hand wheel 15 in one direction will move the conical closure member 16 away from its seat and turning it in the opposite direction will move it toward the seat to close the valve. From the valve 13 a pipe 17 extends through the end wall of the casing C. The valve 13 is preferably provided with packing 18 so that it may be tightened down against the end wall of the casing C to prevent leakage at this point. Pipe 17 connects the valve 13 to the fluid inlet passage 37 in the motor block.

Control of the starting and stopping of the motor and adjustment of its speed is effected by the valve 13. As will appear later, fluid which is exhausted from the motor M will be collected in the casing C and withdrawn through the pipe 12. As the casing C forms a fluid-tight cover for the entire valve mechanism, a compact, clean, oil-tight unit is provided. It will be understood of course that the casing C shown in the drawings is merely illustrative and that this casing may take other forms, or other means may be provided for collecting the oil or other operating fluid from the motor M and conducting it away.

Our motor itself includes a main block which is best seen in Figures 3 to 5 and 18 to 22. The block may be referred to generally by the reference character B, and is formed with a main cylinder bore or chamber 20 extending longitudinally through its upper portion. Below the main cylinder 20 and slightly to one side thereof is the valve bore 21, and adjacent the valve bore 21 are the two, small, spaced valve actuating cylinders 22 and 23. As is perhaps best seen in Figure 5, these valve actuating cylinders are relatively short, and do not extend the full length of the block B as do the main cylinder 20 and the valve bore 21.

Slots 24 and 25 are spaced inwardly from the ends of the main cylinder 20, and a top slot 26 is cut through the upper wall of the block B into the cylinder 20 to accommodate the gear 27 which is mounted on the drive shaft 8. The shaft bearing 1 is secured to the top of the block B by screws 28. The slots 24 and 25 are connected to the valve actuating cylinders 23 and 22 respectively by means of slanting holes 29 and 30. Recesses 31 in the end walls of the block B complete the connection to the valve actuating cylinders 22 and 23 from the slots 25 and 24.

In order to conduct fluid from the valve chamber 21 to the main cylinder 20, spaced slots 32 and 33 are formed in the walls of the valve chamber 21. The slot 32 is connected to one end of the block B by a passage 34, and a similar passage 35 connects the slot 33 to the opposite end of the block B. As is best seen in Figure 18, a recess 36 in the end of the block B completes the connection from the valve chamber 21 to the main cylinder 20. A similar recess 36 is provided on the opposite end of the block B.

The operating fluid inlet 37 extends through the wall of the valve chamber 21, and is centrally disposed between the slots 32 and 33. For reasons which will be fully explained later, we also provide small holes 38 and 39 (see Figures 13-15) which extend through the wall of the valve chamber 21 into a recess 40, which is closed by the screw plug 41. Figure 17 illustrates this arrangement in an enlarged view, and it will be seen that oil may pass through hole 38 into the chamber 40, and thence through hole 39 back into the valve chamber. The location of the hole 40 is clearly seen in Figures 18 and 19, a boss 42 being formed on the block B. It will appear later that the plug 41 is provided solely to permit the desired arrangement of passages and is not removed after it is installed during manufacture.

The main piston or drive member P is shown in detached view in Figure 30, and, as seen in Figures 6, 7 and 8, it is disposed for reciprocation in the main cylinder 20. It will be understood that a vane type main piston may be employed in a segmental main chamber without departing from our invention and the term "piston" and "cylinder" are used herein in a broad sense. The piston P comprises two cylindrical end portions 43 and 44, which are preferably recessed as seen at 45 in Figure 9. Notches 46 and 47 are cut in the ends of the walls of the portions 43 and 44 and the center portion of the piston is cut away to form a bar member 48 having rack teeth 49 thereon which engage the teeth of the gear segment 27. The lower part 50 of the piston is formed on the same diameter as the end portions 43 and 44, and engages the wall of cylinder 20 throughout its length.

The engagement of the rack teeth 49 with the gear 27 prevents rotation of the piston P in the cylinder 20. Thus the notches 46 and 47 in the ends of piston P are maintained in alignment with the recesses 26 in the end walls of the block B. By providing these notches 46 and 47, entry of fluid into the recessed ends of the piston P is permitted, even though the end closure plates 51 and 52 are in position on the ends of the block B and the piston P is at an extreme end position as shown in Figure 9. Suitable packing 53 may be provided between the end plates 51 and 52 and the block B.

In the valve chamber 21 are disposed the outer tubular valve member generally indicated by the reference character V and the inner valve member V'. Mechanical connections in the form of a yoke Y (Figure 32) are provided between the inner valve member V' and the valve actuating plunger or piston member P'. Referring to Figure 31, it will be seen that the member P' is provided with spaced cylindrical end portions 54 and 55 and a flattened connecting bar 56. Screws 57 (Figure 7) secure the web 58 of the yoke Y to the bar portion 56 of plunger P' and the end portions 59 and 60 of yoke Y are formed with U-shaped slots 61, as seen in Figure 33. These slots 61 engage grooves 62 and 63 on the inner valve member V' (Figure 26), and thus reciprocation of the plunger P' will cause corresponding movement of the inner valve member V'.

Figure 5 illustrates the assembled relationship of the plunger P' and yoke Y, the end portion 55 being disposed in the small valve actuating cylinder 23, and the portion 54 being disposed in the small valve actuated cylinder 22. As the yoke Y is secured to the connecting bar 56 of the plunger P', and as the engagement of the slots 61 of the yoke Y with the inner valve member V' does not permit rotation of said inner valve V', the angular relation of the inner valve V' in the valve chamber 21 is maintained. Also the projecting faces 64 (Figures 8 and 33) of yoke Y have sliding engagement with the faces 65 and 66 on the outer valve member V and prevent rotation of the outer valve V relative to the inner valve V' and the valve chamber 21.

Referring now particularly to Figures 10 to 17 and 23 to 29, the construction and operation of our improved self-starting, non-stallable valve mechanism will be explained. Figure 10 illustrates the valve parts in one extreme end position adapted to feed fluid under pressure to the left hand end of the main cylinder 20 as seen in Figures 9 and 20. Fluid enters through the inlet passage 37, and is directed into the slot 33 by the spaced flanges 67 and 68 on the outer valve V. These flanges 67 and 68 have a sliding fit in the valve chamber 21. When the parts are in the position shown in Figure 10, fluid will move from slot 33 through the passage 35 into the left hand end of the cylinder 20 (as seen in Figures 9 and 20) and will move the main piston P to the right. As soon as piston P starts to move, the slot 25 in the main cylinder will be closed off and fluid will exhaust from the right hand end of cylinder 20 through the passage 34 and slot 32 into the space in the main valve chamber between the flange 67 and the end flange 69. An opposite end flange 70 on the outer valve V corresponds to flange 69. From this space free passage to the outside is permitted through discharge opening 71 in the block B (see Figure 5). A similar opening 72 permits exhaust from the cylinder 20 during opposite movement of the piston P.

Just before the piston P reaches the right hand end of its stroke the slot 24 in the wall of main cylinder 20 will be uncovered and fluid under pressure will be transmitted through the passage 30 and the groove 31 into the valve actuating cylinder 23. This pressure will move the plunger member P' and with it, because of the connecting yoke Y, the inner valve member V'. This movement will be to the right in Figure 10. During this initial movement of inner valve V', the outer valve V will not move, but when the hole 73 in the inner valve overlaps the hole 74 in the outer valve, fluid under pressure will pass through the bore 75 in the inner valve and exert pressure on the left hand end of the inner valve assisting in moving it to the right. It will be seen that ring members 76 and 77 form cylinders into which the ends of the inner valve V' may extend. As soon as the end 78 of inner valve V' leaves the ring 76, as seen in Figure 11, fluid pressure will be admitted against the end portion 70 of outer valve V. During movement of inner valve V' from the position shown in Figure 10 to that shown in Figure 11, fluid in the ring 77 may escape through the bore 79 in the inner valve, the hole 80, and the hole 81 in outer valve V with which the hole 80 aligns during the shifting of the valve parts from left to right. During movement of the outer valve V to the right from the position shown in Figure 11 to that shown in Figure 12, fluid may escape from the right hand end of valve V through the groove 82. The end face 83 of valve V preferably reaches alignment with the outer end of the groove 82 just prior to engagement of the end of valve V with the ring member 77. By thus closing off the free discharge of fluid from the right hand end of the main valve V shortly before it strikes the ring 77, a cushioning action is obtained which makes the apparatus very quiet and free from vibration during operation.

When the outer valve V has shifted to the right into the position shown in Figure 12, the main fluid pressure connection from the supply inlet 37 is shifted from the slot 33 to the slot 32 and fluid will move through the passage 34 to the right hand end of cylinder 20 (Figure 9). This will cause the piston P to move to the left in the cylinder 20 until, when the position shown in Figure 9 is again reached, the slot 25 will again be exposed by the piston P, and fluid pressure will be conducted through the slot 25 and passage 29 into the small valve actuating cylinder 22. This will move the plunger P' to cause the valve parts V and V' to return from the position shown in Figure 12 into that shown in Figure 10 through the opposite of the cycle described above. Thus, as long as fluid under pressure is applied through the inlet 37, the piston P will reciprocate in its cylinder 20 imparting an oscillating rotary movement to the gear 27 and shaft 8.

It will be understood that the hole 84 corresponds to hole 73, hole 85 corresponds to hole 80 and slot 86 corresponds to slot 82 in the inner valve V'. So also, hole 87 corresponds to hole 74, hole 88 to hole 81, and end face 89 to end face 83 in the outer valve V.

In order to explain the operation of our improved means for preventing the valve mechanism from remaining in a dead center position, we refer to Figures 13 to 17. Figure 13 illustrates the valve mechanism in what would be a dead center position were it not for the means to be described presently. When in the position shown in Figure 13 the flanges 67 and 68 on the valve V are aligned with and close the slots 32 and 33. Thus, if by any chance the valve mechanism should ever get into this position, fluid entering through the inlet 37 could not reach either end of the main cylinder 20 and the apparatus would not start. In order to eliminate this possibility we provide a small centrally located hole 90 (Figs. 16, 23) which extends into the inner bore 91 of the outer valve V. On the surface of the inner valve V', a groove, having a longitudinal portion 92 and oppositely extending end portions 93 and 94, is formed. The hole 90 and the grooves 92, 93 and 94 are so positioned, and are held so positioned by the yoke Y, that the small hole 90 in the assembled device overlies the outer end of the groove 93 (see Figure 16) when the valve parts 92 are in the position shown in Figure 13.

Thus if during assembly of the device, or on account of vibration when the fluid supply is shut off, the valve parts should ever stop in the position shown in Figure 13, fluid may pass through the hole 90 into the groove 93 when the main control valve 13 is opened. From the groove 93 fluid will pass through the groove 92 and groove 94 and out through the hole 95 (Figure 17) which extends through the thickened portion 96 of the valve V. This thickened portion 96 of valve V fits the inner wall of the valve chamber 21, and when the parts are in the centered position shown in Figure 13, the hole 95 will align with the small hole 38 in the block B. Thus fluid will pass through the hole 38 into the chamber 40, back through the hole 39, and through a hole 97, which also extends through the thickened portion 96 of valve V into the inner bore 91 thereof.

Another small hole 98 is longitudinally aligned with the end of the slot 94 and extends through the wall of the inner valve V' into the bore 75 thereof. Again referring to Figure 13, it will be seen that in the centered position of the parts, the hole 98 is aligned with the hole 97 and thus fluid will pass from hole 97 through hole 98 into the bore 75, and will be effective against the left hand end 78 of the inner valve V' to move it to the right out of its dead center position. As soon as the hole 73 in the inner valve V' aligns with the hole 74 in the outer valve V, pressure will be applied to the left hand end 78 of the inner valve V' in the usual manner, and normal operation of the valve mechanism and piston P will immediately commence.

By arranging the various holes and passages just described in the manner shown in the drawings, the only time these holes will be effective will be when the valve parts V and V' stop in the centered position shown in Figure 13. As seen in Figure 14 when the valve parts are in their extreme left hand position (corresponding to that shown in Figure 10), the holes 95 and 97 are out of alignment with the holes 38 and 39, and thus no flow of fluid will take place through these small passages. So also, a similar disalignment of the holes 95 and 97 with holes 38 and 39 occurs when the parts are in their extreme right hand positions as shown in Figure 15. At no time except when the parts are in the centered position shown in Figure 13 will a fluid conducting connection be established from the source of fluid pressure through these small holes to the left hand end of the inner valve V', and thus at no time will these small holes in any way interfere with the normal operation of the valve mechanism. The only time the small holes and grooves just described come into action is when the valve mechanism is on what would otherwise be a dead center position. Thus these small holes and grooves may be considered to be a safety feature which render our fluid pressure motor self-starting at all times. This is particularly important in motors for airplane windshield cleaners where failure of the motor to start immediately when desired might be extremely serious.

In the mechanism described herein, we have provided a completely self-starting fool-proof fluid pressure actuated motor, the valve mechanism of which is completely free of springs or other resilient means for assisting in the operation of the valve elements. If the shaft 8 of the motor should be stalled in any manner at any part of its travel, as might occur if a windshield cleaner squeegee should freeze to the glass, there will be no serious leakage of fluid through the motor even though the operator neglects to turn off the main valve 13 because the valve mechanism and ports are so arranged that a direct connection from fluid inlet to fluid exhaust is never established.

It will be understood that when the motor is enclosed in a casing as shown at C in Figures 1 and 2, the operating fluid, such as oil, which is discharged through the exhaust openings 71 and 72, will be collected in the casing C and withdrawn through the pipe 12. It will also be understood that the valve actuating plunger P', which operates in the small cylinders 22 and 23, does a minimum of work as it merely starts the inner valve member V' on its movement and, after a relatively short movement by the plunger P', the full operating pressure is effective directly on the end valve member V' to complete its movement. Exhaust from the small cylinder 22 or 23 which is not under pressure during a valve movement takes place through one or the other of the passages 29 or 30 and their terminal slots 25 and 24 into the interior of cylinder 20 adjacent the flattened connecting portion 18 of the piston P. Thus oil may pass out of the main cylinder 20 through exhaust holes 99 and 100, which, as seen in Figures 4 and 5, are centrally located on opposite sides of the block B.

Although the illustrated embodiment of our invention has been described in considerable detail, reference is made to our copending United States patent applications referred to above for disclosure of somewhat modified arrangements incorporating some of the features of the present motor and valve mechanism. Furthermore, we do not wish to be limited to the specific embodiment of our invention herein shown and described, but claim all forms thereof coming within the scope of the appended claims.

We claim:

1. In a fluid pressure actuated motor, a main chamber, a drive member adapted to reciprocate in said main chamber, a valve chamber, fluid conducting passages extending from said valve chamber to the opposite ends of said main chamber, a fluid inlet to said valve chamber, a fluid outlet from said valve chamber, valve means comprising an inner valve member and an outer valve member in said valve chamber adapted when in one position to connect one end of said main chamber to said fluid inlet and the other end of said main chamber to said fluid outlet and when in another position to reverse said connections, said valve means having a dead center position in which both said inlet and said outlet are shut off from said main chamber, and means, independent of said main chamber and operable only when said valve means is in said dead center position, for applying fluid under pressure to said inner valve member and thereby moving said valve means out of said dead center position upon application of fluid under pressure through said fluid inlet to said valve chamber.

2. In a fluid pressure actuated motor, a main chamber, a drive member adapted to reciprocate in said main chamber, a valve chamber, fluid conducting connections from said valve chamber to said main chamber, valve means comprising an inner valve member and an outer valve member in said valve chamber, means for operating said valve means to control the flow of fluid through said connections, and means, effective in any position of said drive member but only when said valve means is in a position to shut off said main chamber from said valve chamber, for applying fluid under pressure to one of said valve members and thereby moving said valve means out of said shut-off position.

3. In a fluid pressure actuated motor, a main chamber, a drive member adapted to reciprocate in said main chamber, a valve chamber, valve means comprising an inner valve member and an outer valve member in said valve chamber, a valve actuating cylinder, a valve actuating piston in said valve actuating cylinder, mechanical operating connections between said valve actuating piston and said valve means, fluid conducting connections between said main chamber and said valve chamber, fluid conducting connections between said main chamber and said valve actuating cylinder, and means for conducting fluid under pressure to said valve actuating cylinder, said valve means having a dead center position in which the flow of fluid from said valve chamber is substantially prevented, and means, independent of the position of said drive member and operable by fluid under pressure from said valve chamber only when said valve means is in dead center position, for conducting fluid under pressure to act on said inner valve member and thereby to move said valve means out of said dead center position and start the motor in normal operation.

4. In a fluid pressure actuated motor, a main cylinder, a piston adapted to reciprocate in said cylinder, a fluid inlet to the motor, fluid conducting means for conducting fluid to said cylinder from said inlet and from said cylinder to exhaust, valve means for controlling the flow of fluid through said fluid conducting means to and from said cylinder, said valve means including inner and outer valve members, a valve actuating cylinder, a valve actuating piston in said valve actuating cylinder, means for mechanically connecting said valve actuating piston to said inner valve member, said inner and outer valve members having a position in which fluid is substantially prevented from flowing either to or from said main cylinder, a plurality of fluid conducting passages in said inner and outer valve members, said passages being positioned whereby, when said inner and outer valve members are in said flow preventing position, said passages conduct fluid under pressure from said inlet to act on one end of said inner valve member to be effective to move said valve means out of said flow preventing position.

5. In a motor of the type described, a cylinder block member, a main cylinder in said block, a valve chamber in said block, a pair of spaced valve actuating cylinders in said block, the longitudinal axes of said main cylinder, valve chamber and valve actuating cylinders being substantially parallel, a double ended main piston having a reduced central portion and being adapted to reciprocate in said main cylinder, said block having fluid conducting passages extending from each end of said main cylinder to spaced points in said valve chamber, said block also having fluid conducting passages extending from points spaced inwardly from each end of said main cylinder to the outer ends of said valve actuating cylinders, said block also having an opening through the main cylinder wall between said inwardly spaced points, a valve actuating plunger member having piston end portions joined by a connecting bar, one of said piston end portions being disposed in one of said valve actuating cylinders and the other of said piston end portions being disposed in the other of said valve actuating cylinders, valve means disposed in said valve chamber, said valve chamber having spaced discharge openings extending through the wall of said block, a yoke member secured to said connecting bar of said plunger member and having legs extending through said spaced openings and having driving engagement with said valve means, a fluid inlet passage extending into said valve chamber, said valve means having a dead center position in which said fluid conducting passages from said main cylinder to said valve chamber are substantially completely closed, and means, effective only when said valve means is in said dead center position, for moving said valve means out of dead center position upon application of fluid pressure through said inlet into said valve chamber.

6. A fluid pressure actuated motor of the reciprocating piston type having valve means for controlling the flow of fluid under pressure to effect reciprocation of the piston, said valve means including an outer valve member having a bore extending longitudinally therethrough, an inner valve member having a sliding fit in said bore, said outer valve member having spaced flanges adapted, when said outer valve is in one position, to shut off the flow of fluid to and from said piston, said outer valve member having a hole extending into said bore between said flanges and a second hole on the opposite side of one of said flanges from said first named hole and also extending into said bore, said holes being out of longitudinal alignment, said inner valve having a groove on the surface thereof adapted, when said inner and outer valve members are in the center of their travel, to align with and connect said holes in said outer valve member, and fluid conducting means, effective only when said inner and outer valve members are in centered position, for conducting fluid from said second hole to one end of said inner valve member whereby said fluid will move said inner valve member out of centered position.

FREDERICK G. FOLBERTH.
WILLIAM M. FOLBERTH.